United States Patent [19]
Tallman et al.

[11] Patent Number: 4,766,425
[45] Date of Patent: Aug. 23, 1988

[54] WAVEFORM SELECTION BY TOUCH

[75] Inventors: James L. Tallman, Hillsboro; Terry G. Sherbeck, Aloha; Beverlea J. Kramlich, Tigard, all of Oreg.

[73] Assignee: Tektronix, Inc., Beaverton, Oreg.

[21] Appl. No.: 944,304

[22] Filed: Dec. 19, 1986

[51] Int. Cl.$^4$ .............................................. G09G 1/00
[52] U.S. Cl. ................................. 340/712; 340/365 P
[58] Field of Search ............... 340/712, 711, 721, 724, 340/365 P; 250/221, 549; 324/121 R

[56] References Cited

U.S. PATENT DOCUMENTS

| | | | |
|---|---|---|---|
| 4,093,995 | 6/1973 | Smith et al. | 340/711 |
| 4,110,749 | 8/1978 | Janko et al. | 340/712 |
| 4,413,314 | 11/1983 | Slater et al. | 340/712 |
| 4,517,559 | 5/1985 | Deitch et al. | 340/712 |

Primary Examiner—John W. Caldwell, Sr.
Assistant Examiner—Alvin Oberley
Attorney, Agent, or Firm—Daniel J. Bedell; Francis I. Gray

[57] ABSTRACT

For an oscilloscope capable of simultaneously displaying a plurality of waveforms on a screen and capable of performing operations with respect to a selected one of the displayed waveforms, a method and apparatus for permitting an operator to select a waveform. A touchscreen mechanism provides input signals to the oscilloscope indicating when and where an operator touches the surface of the screen and a microcomputer within the oscilloscope determines from data controlling the display of each waveform and from the data provided by the touchscreen whether the operator is touching any portion of a displayed waveform. If so, the microcomputer assumes that the operator has selected the waveform touched and reconfigures oscilloscope operation such that operations are performed with respect to the waveform touched by the operator.

8 Claims, 6 Drawing Sheets

WAVEFORM SELECTION BY TOUCH

BACKGROUND OF THE INVENTION

The present invention relates to a digital oscilloscope capable of simultaneously displaying a plurality of waveforms and capable of performing various operations with respect to an operator-selected one of the displayed waveforms, and in particular to a method and apparatus for permitting an oscilloscope operator to control waveform selection.

Many digital oscilloscopes can simultaneously display several waveforms, each representing the magnitude of a different input signal as a function of time. Such oscilloscopes permit an operator to adjust various display attributes of each of the waveforms including for example, its vertical position on the oscilloscope's screen, the scaling of its vertical size, its trigger level, its color, its intensity, etc. Since each waveform may have several adjustable display attributes and since several waveforms may be displayed, it may be impractical to provide a separate front panel knob or switch for controlling each attribute of each waveform. Some oscilloscopes provide a separate knob or switch for controlling each display attribute and a set of pushbuttons or a rotary knob for permitting an operator to "select" a particular one of the displayed waveforms. In order to change a display attribute of a particular waveform, an operator first selects the waveform using the waveform selection knob or pushbuttons. Once the waveform is selected, the oscilloscope reconfigures itself so that it responds to operation of any of the waveform attribute control knobs or buttons by changing display attributes of the selected waveform.

Other oscilloscopes eliminate the need for dedicated waveform selection knobs or pushbuttons by permitting the operator to select a waveform from a list of waveforms on a "waveform selection" menu displayed on the screen. With some menu-based oscilloscopes, an operator indicates his selection by depressing a particular one of a set of menu item selection pushbuttons, often mounted on the oscilloscope near the screen. While such oscilloscopes still require the use of pushbuttons for waveform selection, the pushbuttons may be used for other purposes when other menus are displayed. Some menu-based instruments have "touchscreen" input systems which sense when an operator has touched an instrument screen and provide input data to the instrument indicating the screen coordinates of the touch. Such touchscreen instruments permit an operator to make selections from a displayed menu by directly touching a selectable menu item, thereby eliminating the need for menu item selection pushbuttons.

Some digital oscilloscopes also include provisions for assisting an operator in making various measurements with respect to an operator-selected waveform. For example, an oscilloscope may determine and display data representing the magnitude of any point on a selected waveform indicated by an operator controlled cursor, may determine the minimum and maximum magnitudes of a selected waveform between two points indicated by a pair of operator controlled cursors, or may show an operator-determined portion of a selected waveform in expanded horizontal scale. By permitting an operator to "select" the waveform upon which such measurements are to be performed, the need for separate pushbuttons, control knobs and other input devices for separately controlling measurement parameters for each displayed waveform is eliminated.

Thus by providing the operator with the ability to "select" a displayed waveform for purposes of directing the response of the oscilloscope to operator manipulation of various pushbuttons, knobs or other input devices which control waveform display attributes or waveform measurement parameters, the number of such input devices needed to control the oscilloscope can be reduced. However, requiring the operator to select a waveform before using such devices to manipulate waveform display attributes or measurement parameters adds complexity to what the operator must know and do in order to adjust an oscilloscope operation. For example, in the case of a menu-based system, he must first cause the oscilloscope to display the waveform selection menu and he must select a waveform from the menu once displayed. In some systems he must also cause the oscilloscope to remove the menu from the screen once the selection is made. These extra steps increase the time required for an operator to change waveform display attributes or measurement parameters. The additional steps can also lead to more frequent human error because it is not always easy to determine which waveform corresponds to a particular waveform selection menu item when the operator is free to alter the order in which waveforms are displayed on the oscilloscope screen.

What is needed is a system permitting an operator to provide input to a digital oscilloscope indicating an operator's selection of a waveform, wherein the system is easy to understand and use.

SUMMARY OF THE INVENTION

The present invention relates to a microcomputer-based digital oscilloscope capable of simultaneously displaying a plurality of waveforms on a screen and capable of changing display attributes, performing measurements, or other operations with respect to an operator-selected one of the displayed waveforms. In accordance with one aspect of the invention, a system is provided for such an oscilloscope whereby an operator may indicate his or her selection of a particular one of the displayed waveforms by touching any part of the waveform's image on the screen. Waveform selection by touch is generally faster, more intuitive and less prone to error than waveform selection by depressing a pushbutton corresponding to the waveform, by setting a control knob to a position corresponding to the waveform, or by selecting a menu item corresponding to the waveform. In such systems of the prior art the operator must perform the extra mental step of correlating the particular waveform to be selected with a particular pushbutton, a particular knob position or particular menu item, and this extra mental step adds time and opportunity for human error to the waveform selection process.

According to another aspect of the invention horizontally and vertically directed light beams produced by a conventional touchscreen mechanism are superimposed on the surface of the oscilloscope screen so as to partition the screen into a pattern of "touch zones", rectangular areas surrounding each light beam intersection. Based on which light beams are intercepted by an operator's finger, the touchscreen mechanism provides data input to the oscilloscope's microcomputer indicating when the operator has touched or stopped touching the screen and indicating which touch zone the operator touched. The microcomputer determines from stored waveform data utilized to control the display of each waveform whether any portion of any displayed waveform passes through the last touch zone touched by the operator. If some portion of a particular waveform passes through this touch zone, the microcomputer reconfigures the oscilloscope to subsequently carry out such operations as may be relevant to an operator-selected waveform with that particular waveform as the selected waveform.

In a typical digital oscilloscope, each waveform is displayed on the oscilloscope as a line of pixels, the vertical screen position of each pixel being determined by a separate datum of a waveform data sequence produced by periodically digitizing an input signal. In accordance with a further aspect of the invention, the microcomputer determines that a particular waveform passes through a touch zone when at least one pixel of the waveform falls within the touch zone or when two successive pixels of a waveform horizontally and vertically bound any portion of the touch zone. The latter case is particularly important when the touch zone is located over a leading or trailing edge of a square wave which rises so abruptly that none of the pixels making up the waveform actually appear within the touch zone but wherein two successive pixels may straddle the touch zone.

It is accordingly an object of the invention to provide a new and improved method and apparatus for permitting an operator to provide input to a digital oscilloscope indicating an operator's selection of a waveform.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DRAWINGS

DETAILED DESCRIPTION

Figure 1:
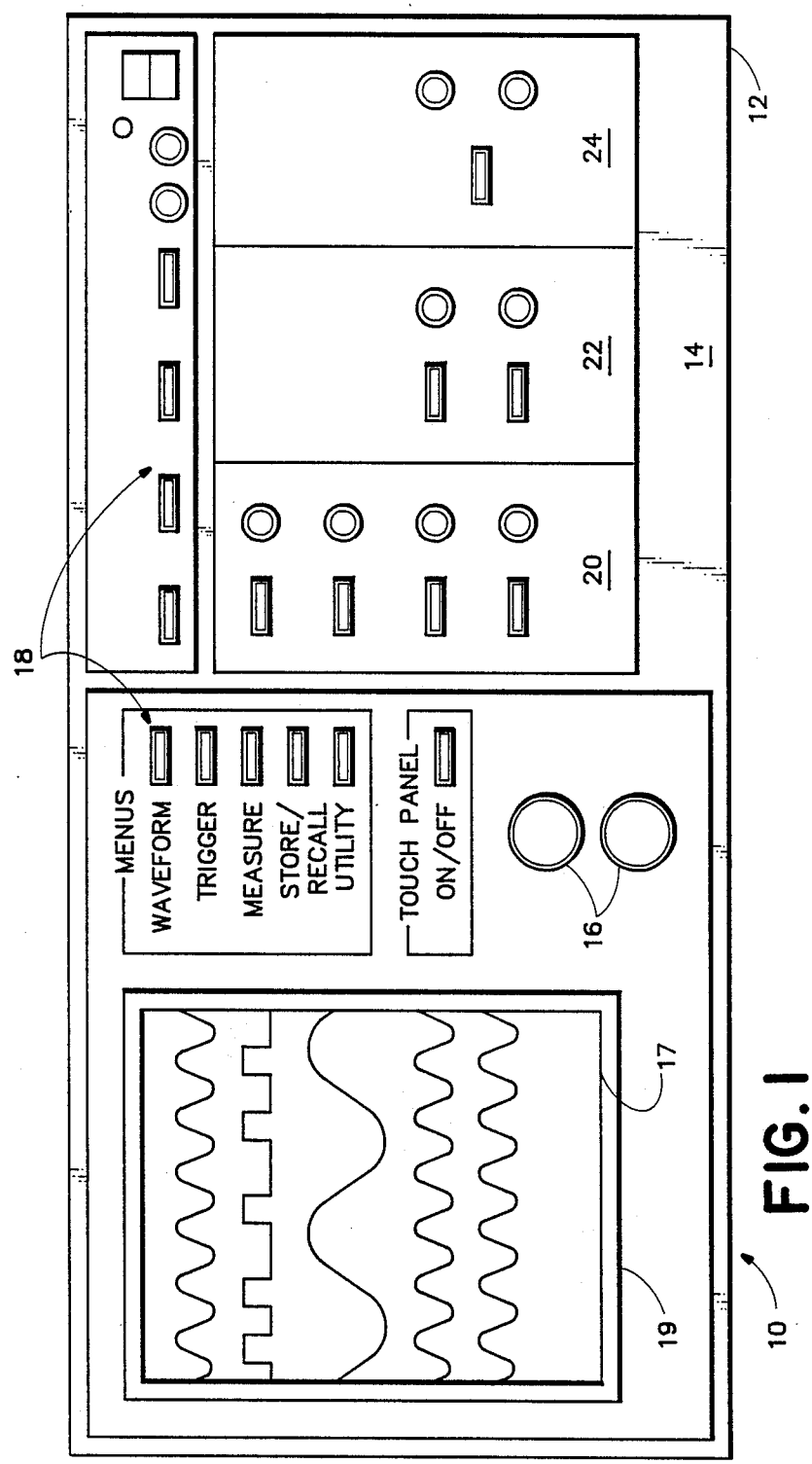
FIG. 1 is a front elevation view of an oscilloscope utilizing the present invention.

The present invention relates to a method and apparatus for permitting an operator to select one of a plurality of waveforms displayed on the screen of a computer-based digital oscilloscope. Referring to FIG. 1, depicting a front elevation view of such a microcomputer-based digitizing oscilloscope 10, oscilloscope 10 includes a main chassis 12, a front panel 14 mounted on the chassis, control knobs 16, a screen 17 and pushbuttons 18 mounted on the front panel, as well as a set of three "plugins" 20, 22 and 24. Each plugin comprises a hardware subsystem of the oscilloscope mounted on a small, removable chassis "plugged" into main chassis 12 through a corresponding slot in front panel 14. The plugin hardware subsystems, interconnected with other hardware within chassis 12 through backplane wiring in chassis 12, may include vertical channel amplifiers, trigger systems and other equipment. Each plugin includes an individual front panel on which additional pushbuttons, control knobs and jacks may be mounted. The screen 17 is adapted to display waveforms, menus, data and other graphics and text produced by the oscilloscope and includes a "touch-screen" 19, a well-known mechanism comprising rows of light sources and light sensors distributed around the edge of the screen 17 for providing input data to the oscilloscope indicating locations on the screen touched by an operator's finger. The touchscreen 19 is useful, for example, in permitting an operator to make selections from menus displayed on the screen, which menu selections cause the oscilloscope to change various aspects of its operation.

Figure 2:
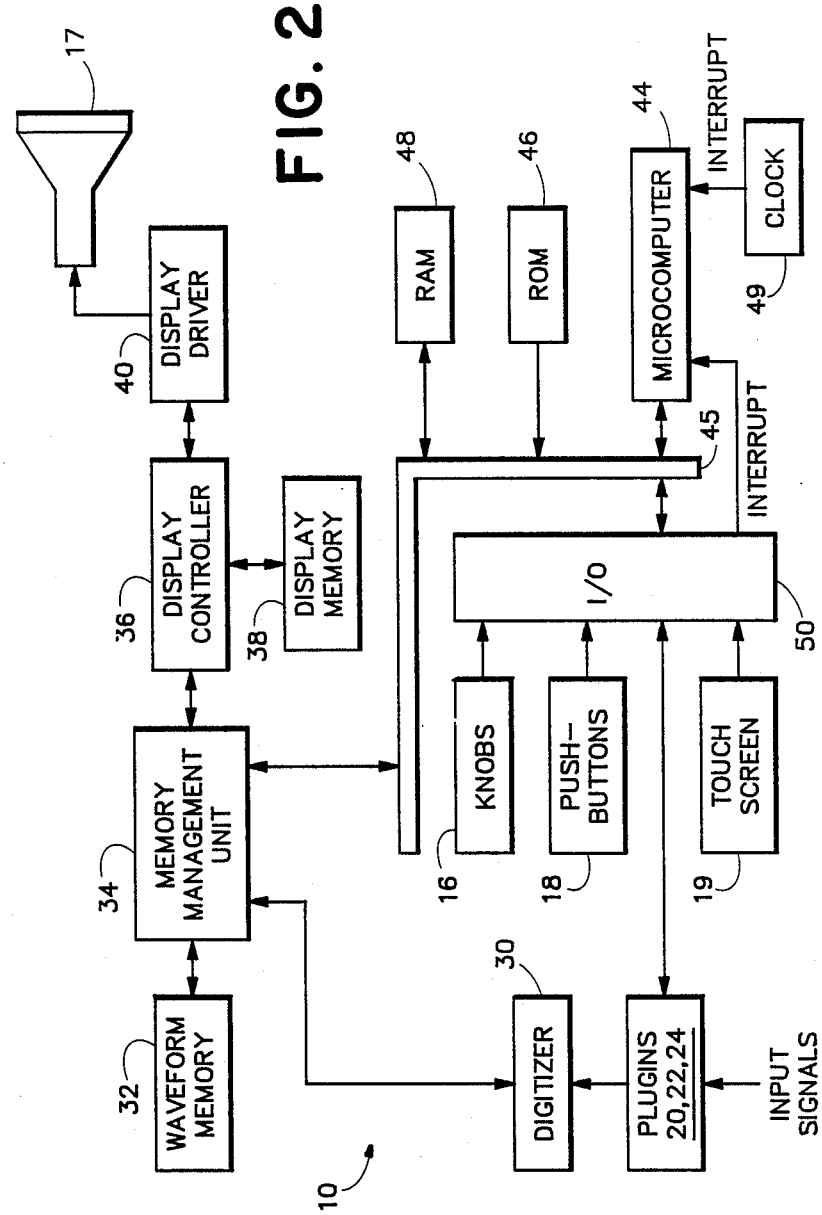
FIG. 2 is a block diagram of hardware associated with the oscilloscope of FIG. 1.

FIG. 2 is a block diagram of hardware associated with the oscilloscope 10 of FIG. 1. Signals produced by devices under test and applied as inputs to oscilloscope 10 through jacks on plugins 20, 22 and 24 are preconditioned by the plugins and applied as waveform and triggering inputs to a digitizer 30. The digitizer 30 digitizes selected input signals to produce sequences of waveform data representing the magnitude of successive input signal samples, and transmits these waveform data sequences for storage in a waveform memory 32 by way of a memory management unit 34 which arbitrates competing demands for access to the waveform memory 32. Memory management unit 34 is described in detail in copending U.S. patent application No. 912,024, filed Sept. 25, 1986, entitled "Concurrent Memory Access System", incorporated herein by reference. Through memory management unit 34, a display controller 36 acquires selected waveform data sequences stored in waveform memory 32 and utilizes these sequences to create a bit map of an oscilloscope display, the bit map being stored in a display memory 38. The display controller 36 periodically acquires bit map information from the display memory 38 and transmits it to a display driver 40 which produces a display on the cathode ray tube screen 17 of the oscilloscope 10 according to bit map data.

The memory management unit 34 also provides a microcomputer 44 with read and write access to waveform memory 32 by way of a computer bus 45 including control, data and address lines. Microcomputer 44 suitably comprises an Intel model 80286 microprocessor and may include an Intel 80287 arithmetic coprocessor for performing fast arithmetic operations and an Intel 82258 direct memory access (DMA) controller for fast I/O operations. The microcomputer 44 operates under control of software (sometimes called "firmware") stored in a read only memory (ROM) 46 and utilizes a RAM 48 for temporary data storage, ROM 46 and RAM 48 being accessed through bus 45. Microcomputer 44 is programmed to carry out a number of functions including, for example, the control of operating states of plugins 20, 22 and 24, digitizer 30, and display controller 36. The microcomputer 44 provides control input signals to plugins 20, 22, and 24 through bus 45 to which the plugins are connected by means of suitable bus input/output (I/O) interface circuitry 50. Microcomputer 44 also controls digitizer 30 operating modes through commands sent over bus 45 and stored in waveform memory 32 by way of memory management unit 34, the stored commands being subsequently read out of memory 32 by digitizer 30. Microcomputer 44 determines which stored waveform data sequences display controller 36 is to display by sending commands to memory management unit 34 telling it to obtain selected waveform sequences from memory 32 and to transmit them to the display controller 36. Microcomputer 44 may also control the display of menus, graphics and data on screen 17 by storing display control data in waveform memory 32 and commanding memory management unit 34 to forward that data to the display controller 36.

Input signals, produced by operation of the oscilloscope main front panel knobs 16 and pushbuttons 18, by operation of knobs, pushbuttons or switches on the individual front panels of plugins 20, 22, or 24, and by operation of the touchscreen 19, are sensed by the I/O circuitry 50 which transmits messages to microcomputer 44 in response thereto. In response to the messages, microcomputer 44 configures various subsystems of the oscilloscope for selected modes of operation. Firmware for controlling the display of menus and operation of microcomputer 44 in response to operation of oscilloscope front panel pushbuttons and the touchscreen is described in copending U.S. patent application No. 902,363, filed Aug. 29, 1986, entitled "Menu-based Oscilloscope Operating State Configuration System", incorporated herein by reference.

The hardware architecture of FIG. 2 permits the response of the oscilloscope to rotation of knobs 16 to be determined by software rather than by hard-wired connections, and this enables oscilloscope response to rotation of either one of the knobs 16 to be changed so each knob may be utilized to adjust more than one aspect of oscilloscope operation. The particular control function assigned to each knob at any given time depends on the current operating state of the oscilloscope and may change when the operating state of the oscilloscope changes.

The operating state of the oscilloscope changes in response to operator input to the oscilloscope, as for example when the operator depresses a front panel pushbutton or utilizes the touchscreen to make a selection from a displayed menu, and the oscilloscope automatically reassigns the function of the knobs to suit the new operating state of the oscilloscope. For example, the oscilloscope may determine and display data representing the magnitude of an operator-selected one of the displayed waveforms at a point along the selected waveform indicated by a cursor on the screen. When the operator makes an appropriate selection from a menu, the oscilloscope enters an operating state wherein one of the knobs 16 is assigned to control the position of the cursor such that the operator can change the cursor position. In other oscilloscope operating states, a knob 16 may for example be utilized to control display attributes of an operator-selected one of the waveforms displayed on the oscilloscope screen by setting the value of a parameter controlling trigger delay for the waveform, or by setting the value of a parameter controlling the vertical position, vertical sizing or horizontal time scale of a operator-selected waveform.

Note that when the two knobs 16 are utilized to control waveform display attributes such as for instance vertical sizing (i.e., vertical volts/division scaling) and vertical position of the waveform on the screen, the operator must "select" one of the waveforms displayed on the screen. By selecting a waveform, the operator tells the oscilloscope which one of the waveforms displayed on the screen is to be adjusted in response to operation of the knobs. Some oscilloscopes of the prior art permit the operator to indicate waveform selection in a number of ways including, for example, depressing a front panel pushbutton corresponding to the waveform or selecting a menu item corresponding to the waveform from a "waveform selection" menu displayed on the screen. However, in accordance with the present invention, a system is provided whereby an operator may indicate to the oscilloscope selection of a particular one of the displayed waveforms by touching any part of the waveform's image on the screen. Waveform selection in this manner is generally faster, more intuitive and less prone to error than waveform selection of the prior art in which the operator must perform the extra mental step of correlating the particular waveform to be selected with a particular pushbutton or menu item. This extra mental step adds extra time to the oscilloscope adjustment process and increases opportunity for human error.

Figure 4:
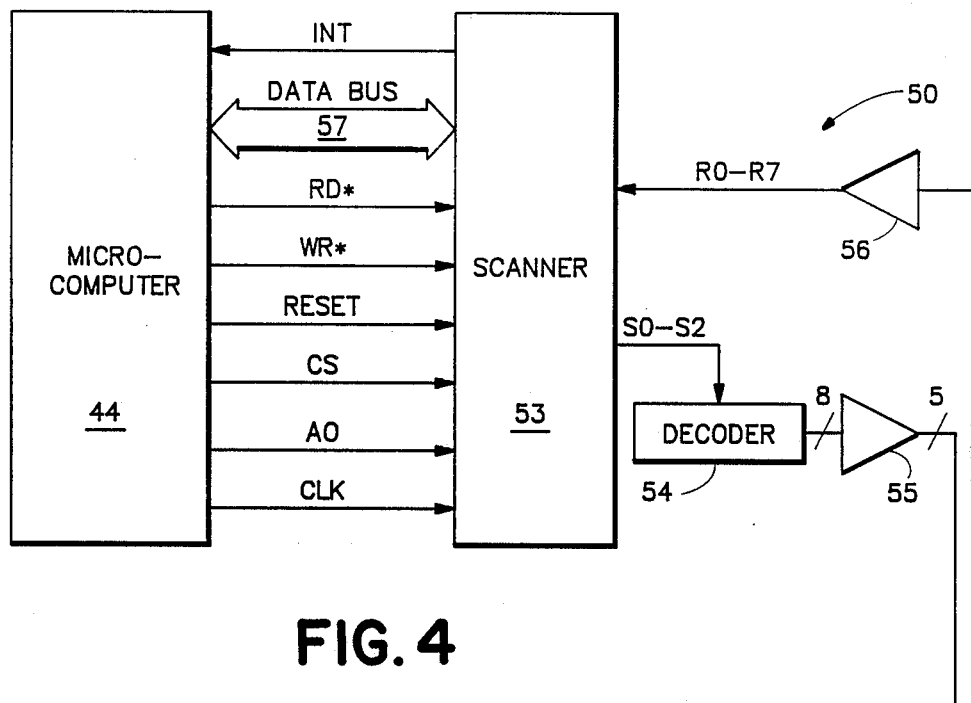
FIG. 4 is a block diagram of the touchscreen and a portion of the input/output circuitry of FIG. 2 which provides touchscreen input/output interfacing.
Figure 4:
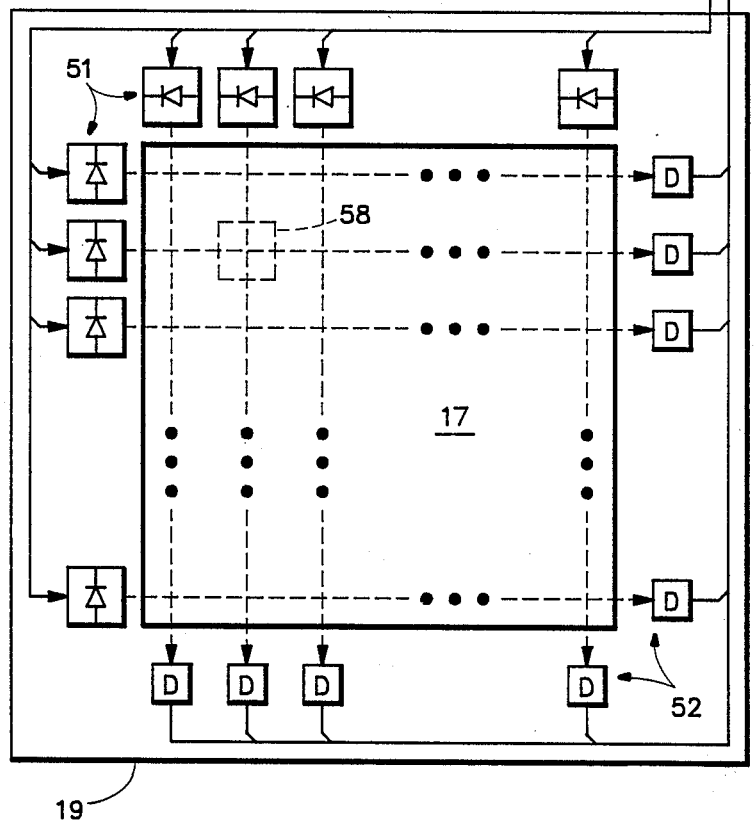

FIG. 4 depicts in block diagram form the interconnections between the touchscreen 19, the microcomputer 44, and a portion of the I/O circuitry 50 which provides touchscreen input/output interfacing. The touchscreen 19 suitably includes a row of 11 light emitting diodes (LEDs) 51 across the top edge of the screen 17 and a column of 22 LEDs 51 along the left side of the screen. The LEDs 51 are arranged to produce an 11×22 grid of light beams immediately in front of the screen, and a set of 33 photodetectors 52 are positioned along the bottom and right edges of the screen so that a separate photodetector 52 is able to detect the light beam produced by each LED when the beam reaches the edge of the screen directly opposite the LED. When the operator touches the screen, his finger may prevent one or more light beams from reaching photodetectors positioned to detect them and each photodetector 52 produces an output signal of state indicating whether the photodetector currently detects the light beam produced by the corresponding LED 51.

The I/O circuitry 50 includes a scanning circuit 53, suitably comprising an Intel Corporation model 8279 programmable keyboard interface device operating in its "sensor matrix" mode. Scanning circuit 50 produces a three bit count output (S0–S2) which is decoded by a decoder 54 to drive one of eight decoder output lines high, depending on the current count carried on lines S0–S2. Five of the eight decoder output lines are buffered by a set of buffers 55, and each of the outputs of buffers 55 is utilized to drive a separate group of up to eight of the 33 (11 horizontal and 22 vertical) LEDs 51. The output signal of each photodetector 52 is applied as an input to one of a set of eight buffers 56 and the outputs R0–R7 of buffers 56 are provided as inputs to the scanner 53.

During a scanning operation, the scanner 53 periodically increments its count output S0–S3 and each time the count output is incremented, decoder 54 energizes a separate one of its eight output lines which in turn causes the corresponding buffer 55 to energize up to eight LEDs 51. Assuming that the operator does not interrupt any of the light beams produced by the energized LEDs, each photodetector 52 corresponding to an energized LED drives an input to a separate one of buffers 56 high, thereby driving the outputs R0–R7 of such buffers 56. When the operator's finger intercepts one of the light beams, the output of one of the photodetectors 52 is driven low and its state will be reflected by its corresponding output signal R0-R7. The scanner 53 includes an 8×8 bit memory for storing the state of each of the up to eight signals R0-R7 returned in response to each of the eight different values of its count output S0-S2. Once the count reaches its limit (111), it is reset to 000 and starts over. The new data R0-R7 acquired for each count value replaces the data acquired for that count value during the previous count cycle. Thus each of 33 of the 64 data bits in the internal memory in the scanner indicates whether or not a separate one of the 33 photodetectors 52 detected a light beam during the last scanner count cycle. The remaining 31 data bits are not utilized for indicating touchscreen output signal states.

The scanner 53 also includes provisions for comparing the current states of the input signals R0-R7 produced in response to its current count output S0-S2 to the states of data stored in its internal memory when the count last had the same value. Whenever the scanner 53 determines the state of at least one of the R0-R7 signals has changed, it replaces the previously stored data with the new data, transmits an interrupt signal (INT) to microcomputer 44, and then suspends its scanning operation. When the microcomputer 44 receives the interrupt, it reads all 64 bits of data in the scanner memory as a sequence of 8 eight bit words, the data being passed to the microcomputer over an 8 bit data bus 57. The microcomputer 44 determines from this data whether and where the operator is touching the screen. Once the microcomputer has acquired and processed the scanner data, it transmits an end interrupt command to the scanner 53 which signal tells the scanner to resume its scanning operation.

Other signals provided to the scanner 53 by the microcomputer 44 include a clock signal CLK utilized by the scanner for internal timing, a RESET signal for initializing the scanner, a chip select signal CS for enabling data bus interface circuitry within the scanner to transmit or receive data, read and write signals RD* and WD* (the * symbol means the signal is active low) for controlling the direction of data flow on bus 57 and a line A0 of the microcomputer's address bus utilized to indicate whether signals transmitted to the scanner on the data bus 57 are data or commands.

The resolution with which the microcomputer 44 determines the position of the operator's finger on screen 17 depends on the number of horizontal and vertical light beams utilized by the touchscreen mechanism 19. When one vertical and one horizontal beam are intercepted by the operator's finger, microcomputer 44 can determine that the finger is within a particular "touch zone", a rectangular area surrounding the point of intersection of the two beams, such as for example touch zone 58. Each light beam intersection therefore defines the center of a separate touch zone such that the screen is divided into a grid of touch zones.

The operation of the microcomputer 44 in handling touchscreen input data is controlled by a touchscreen interrupt routine and a clocked interrupt routine. The touchscreen interrupt routine is initiated when scanner 53 interrupts the microcomputer 44 in response to a change in the touchscreen output data. In executing the touchscreen interrupt routine, the microcomputer reads the touchscreen data stored in the scanner and sets the values of parameters to indicate the coordinates of any touch zone touched by the operator, or to indicate the operator is not touching the screen, as determined from the touchscreen data. The clocked interrupt routine is initiated periodically, whenever the clock 49 of FIG. 2 generates an interrupt signal (suitably every 20 msec.). In executing the clocked interrupt routine, the microcomputer 44 determines if the current touch zone coordinates have remained the same for a predetermined number of clocked interrupts, and if so, enqueues a command in a command queue which command includes the parameters indicating the coordinates of the touch zone touched by the operator, or indicating that the operator has stopped touching the screen. The commands in the command queue invoke routines which cause the microcomputer 44 to respond to screen touches, or cessation of a screen touch in various ways. Since the touchscreen input data must remain constant for a predetermined number of clocked interrupts in order for a screen touch to be considered valid, the chances of enqueuing a succession of touchscreen inputs when an operator's finger intermittently crosses a light beam are minimized. The interrupt routines are discussed in copending U.S. patent application Ser. No. 939,645, filed Dec. 8, 1986, entitled "Touchscreen Input Validation System".

When the microcomputer 44 determines that the operator has touched a particular touch zone, it checks to see if the touch zone is included within a menu displayed on the screen. If so, and if the touch zone is included within a selectable menu item, the microcomputer changes the operating state of the oscilloscope according to the operator's selection. If the microcomputer 44 determines that the operator has touched an area on the screen not within a displayed menu, then the microcomputer determines from the data in waveform memory 32 whether any portion of any displayed waveform passes through the touch zone touched by the operator. If some portion of a particular waveform passes through the touch zone, the microcomputer assumes that the operator has "selected" that waveform and reconfigures the oscilloscope to subsequently carry out such operations as may be relevant to an operator-selected waveform utilizing that particular waveform as the selected waveform.

Figure 3A:
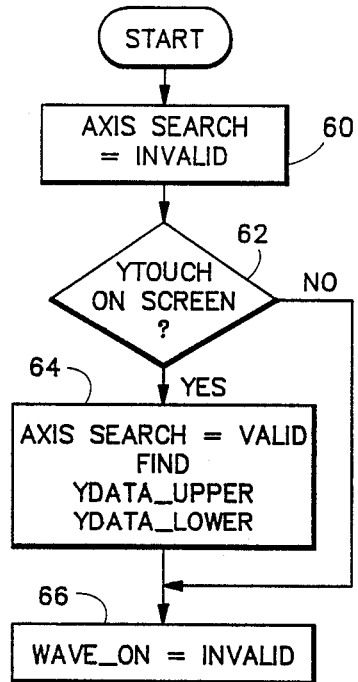
FIGS. 3A-3C show a flow chart for programming the microcomputer of FIG. 2 to determine whether an operator has touched a waveform displayed on the screen of the oscilloscope of FIG. 1.
Figure 3B:
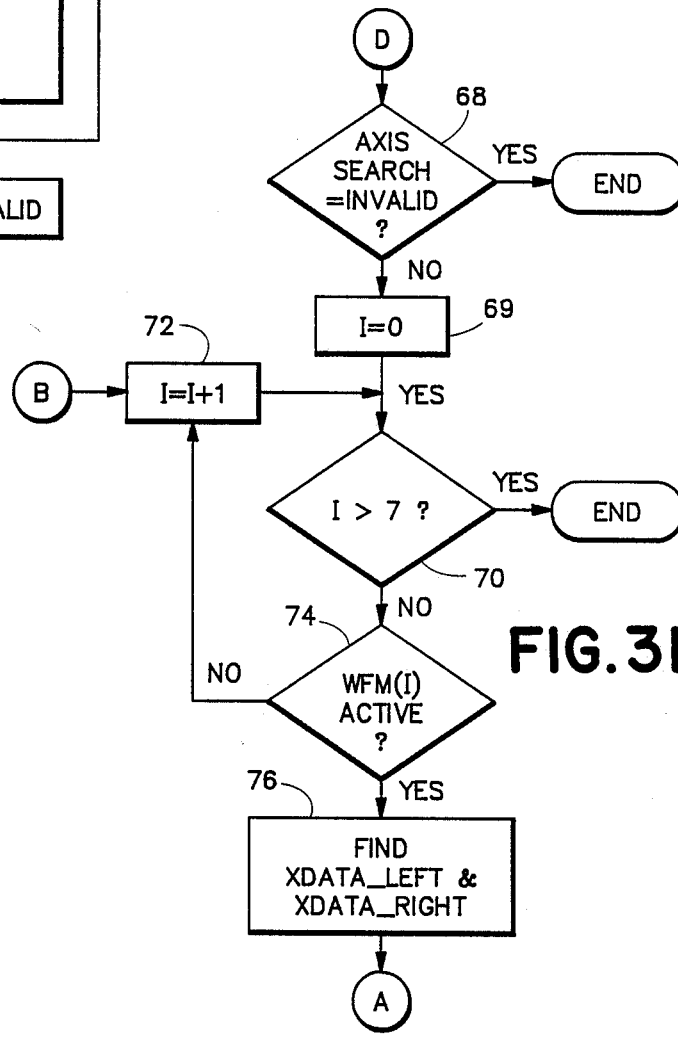
Figure 3C:
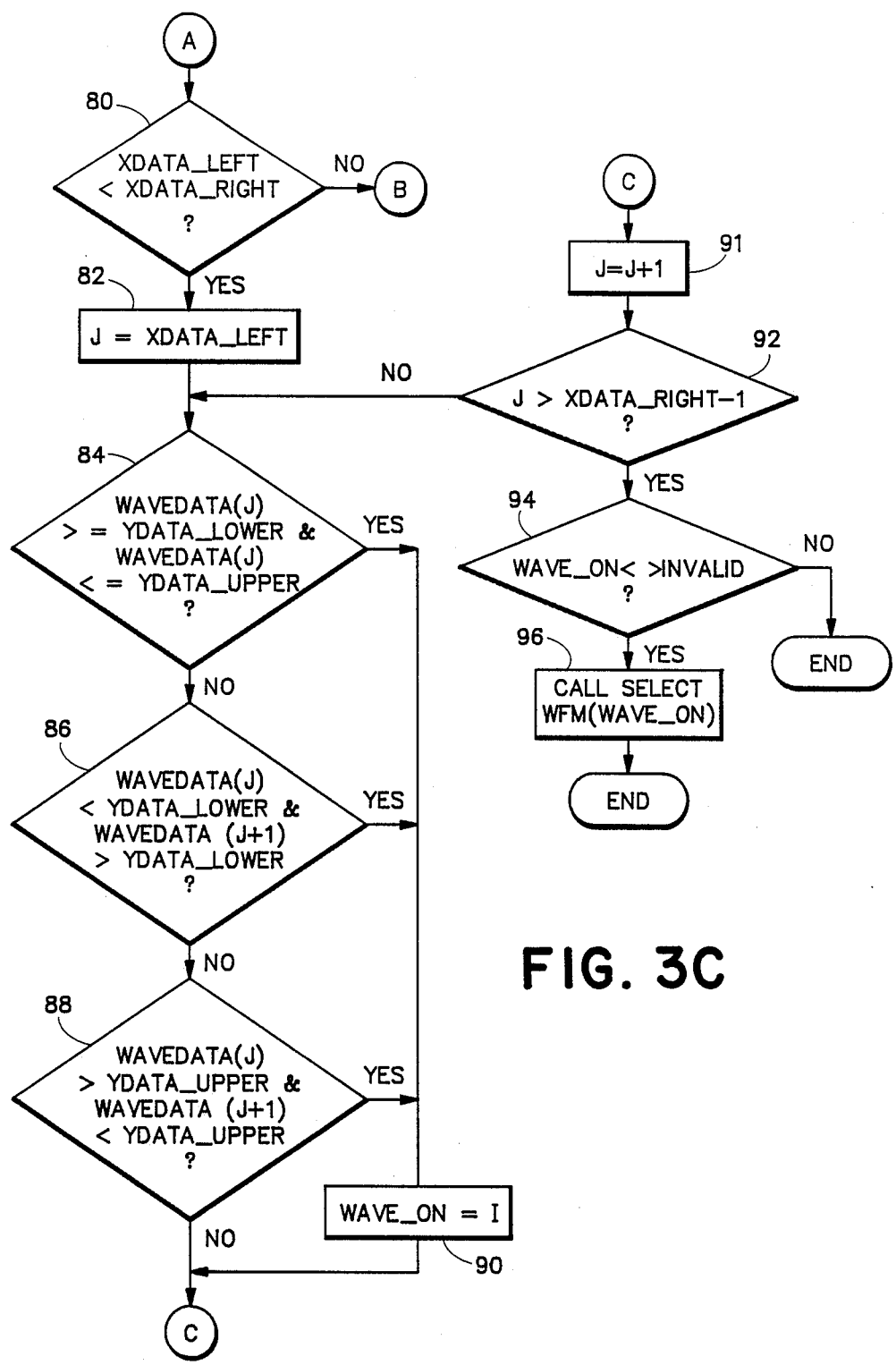

FIGS. 3A-3C show a flow chart for a subroutine executed by the microcomputer 44 when carrying out the operation of determining whether any one of the displayed waveforms passes through the touch zone touched by an operator. The subroutine, listed in Appendix I to this specification, is written in the Intel Corporation PLM programming language. The subroutine is called after the microcomputer determines that the operator has touched the screen and after determining that the touch zone does not lie within the bounds of a menu displayed on the screen. The operator-selected touch zone is identified by two parameters xtouch and ytouch which indicate horizontal and vertical (X and Y) coordinates of the touch zone in the touch zone grid. The values of xtouch and ytouch are determined and stored in memory by the microcomputer after the operator touches the touch zone.

Starting in block 60, an "axis search" flag is set to an "invalid" state and then (block 62) the value of ytouch is checked to ensure that the touch zone is within the waveform display area of the screen and not too far to the right or the left. If the touch zone is in the waveform display area, then (block 64) the axis search flag is set to a valid state and the values of two parameters ydata_upper and ydata_lower are calculated. The ydata_upper and ydata_lower parameters indicate vertical positions on the screen of the upper and lower edges of the rectangular touch zone which positions may be computed from the value of ydata, which indicates where on the screen the center of the touch zone lies, and from the known vertical dimension of the touch zone.

After block 64, or after block 62 if the touch zone is not in the waveform display area, the microcomputer sets a wave_on flag to an "invalid" state (block 66) and then checks to see if the axis search flag is still invalid (block 68). If the axis search flag is invalid, indicating that the touch zone is outside the waveform display area, the subroutine ends. However, if the axis search flag is valid, a counter I is set to 0 (block 69). In the preferred embodiment of the invention, the oscilloscope is capable of simultaneously displaying up to 8 different waveforms numbered from 0 to 7 and the counter I is a reference to the waveform number. Information concerning various aspects of the display of each waveform is stored in RAM 48 of FIG. 2 and if I is not greater than 7 (block 70) the microcomputer checks the display information stored in RAM 48 to determine if waveform I is actively displayed (block 74). If not, the value of I is incremented (block 72), and if I is not yet greater than 7 (block 70), the microcomputer again checks display information in RAM 48 to see if the next waveform is displayed.

The subroutine continues to loop through blocks 70, 74 and 72 until in block 74 it is determined that a waveform is displayed, or until in block 70 I attains a value of 8. In the latter case, no waveform is displayed and therefore no waveform can pass through the touch zone. Thus the subroutine ends after block 70. However if the microcomputer finds in block 74 that a waveform is displayed, it finds from the value of xdata (block 76) the values of two parameters, xdata_left and xdata_right. The xdata_left and xdata_right parameters indicate a waveform data record in waveform memory 32 containing digitized waveform data corresponding to the first and last pixels of waveform I which are displayed at horizontal screen positions falling between the horizontal screen positions of the left and right edges of the the touch zone. The xdata_left parameter value is computed by dividing the number of waveform data values in the record utilized to represent the waveform by one less than the number of touch zones spanning the width of the screen and multiplying the result by xtouch−1. The xdata_right parameter value is computed by dividing the number of waveform data values utilized to represent the waveform by one less than the number of touch zones spanning the width of the screen and multiplying the result by xtouch.

In block 80 the computer checks to see that xdata-left is less than xdata right. This is always true unless the waveform record length is zero. If the record length is zero, no waveform data has been stored for waveform I and therefore no waveform is displayed. In such case, waveform I cannot pass through the touch zone, and the routine returns to block 72 to increment I and begin investigating the next waveform. When xdata_left is less than xdata_right, an integer variable J is set to xdata_left (block 82). J indicates the Jth data position in the waveform data record for waveform I. The microcomputer then performs a series of three tests to determine if waveform I passes through the selected touch zone.

In the first test (block 84) it checks to see if wavedata(J), the value of waveform data at the Jth position, is between ydata_lower and ydata_upper. If so, this indicates that the Jth pixel of waveform I is displayed between the upper and lower edges of the touch zone. Since it has been established that the Jth pixel is horizontally situated between the left and right edges of the touch zone, then it is certain that the point falls within all boundaries of the touch zone and therefore, that the operator has selected the waveform. In such case, the microcomputer sets the value of a wave_on parameter to I (block 90) to indicate that waveform I has been selected.

When the Jth pixel of waveform I does not fall within the touch zone, the microcomputer checks (block 86) to see if wavedata(J) is less than ydata_lower and if wavedata(J+1), the magnitude of data at waveform record position J+1, is greater than ydata_lower. This second test is necessary, for example, when waveform I is an abruptly rising square wave and the touch zone is on the leading edge. In such case the Jth pixel may be just below the lower edge of the touch zone and pixel J+1 may be just above the upper edge of the touch zone. If the result of the test of block 86 is positive, then waveform I has been selected and wave_on is set to I in block 90. Otherwise, the microcomputer performs the third test (block 88) wherein it checks to see if wavedata(J) is greater than ydata_upper and wavedata(J+1) is less than ydata_upper. This situation can occur when the touch zone is situated over the falling edge of a squarewave and points J and J+1 are above and below the upper and lower edges of the touch zone, respectively. In such case, wave_on is set to I in block 90.

If the combination of wavedata(J) and wavedata(J+1) fails all three tests in blocks 84, 86 and 88, or after wave_on is set to I in block 90, then the value of J is incremented (block 91). If the value of J has not surpassed xdata_right-1, then the three tests of blocks 84, 86 and 88 are repeated for the new waveform data positions J and J+1 utilizing the incremented value of J. When the tests have been performed for all values of J between xdata_left and xdata_right−1, the value of wave_on is checked to see if it is still set to its "invalid" value which indicates that a waveform was not selected. If so, the subroutine ends without causing the oscilloscope to reconfigure to account for a change in selected waveform. However, if wave_on is set to a value from 0 to 7, indicating a waveform was selected, then in block 96, a "select_wfm(wave_on)" subroutine is called. This subroutine causes the display of the waveform indicated by wave_on to be highlighted and causes the display of any previously selected waveform to be dehighlighted in order to provide an indication to the operator as to which waveform was selected. The select waveform subroutine also reconfigures the oscilloscope operating state to ensure that oscilloscope operations carried out with respect to the "selected" waveform are subsequently carried out with respect to the waveform indicated by the wave_on parameter. Actions performed by the select waveform subroutine may include, for example, the setting of the values of one or more global variables accessible by other subroutines that perform operations with respect to the selected waveform, such as subroutines which respond to operation of front panel knobs 16 of FIG. 1.

In carrying out the routine charted in FIGS. 3A–3C, the microcomputer checks to see if each waveform is active (block 74) in the order that the waveforms are numbered, since I (the waveform number) is initialized to 0 in block 69. When an active waveform is found, the microcomputer checks to see if the waveform passes through the touchzone and if so, that waveform is selected and the routine ends. It may happen that several waveforms pass through a touchzone touched by the operator, and in such case the waveform having the lowest waveform number (I) will always be selected.

However, some users may find it advantageous, when more than one waveform passes through a touchzone, to alternate the waveform selected each time the touchzone is touched. For example, when waveforms 2, 4 and 7 all pass through the same touchzone, waveform 2 would be selected the first time the touchzone is touched, waveform 4 would be selected the next time the touchzone is touched, waveform 7 would be selected on the third touch, and waveform 2 would be selected again on the fourth touch. In order to modify the algorithm of FIGS. 3A-3C to provide for this alternative mode of operation, it is necesary only modify the portion of the flow chart shown in FIG. 3B.

Figure 5:
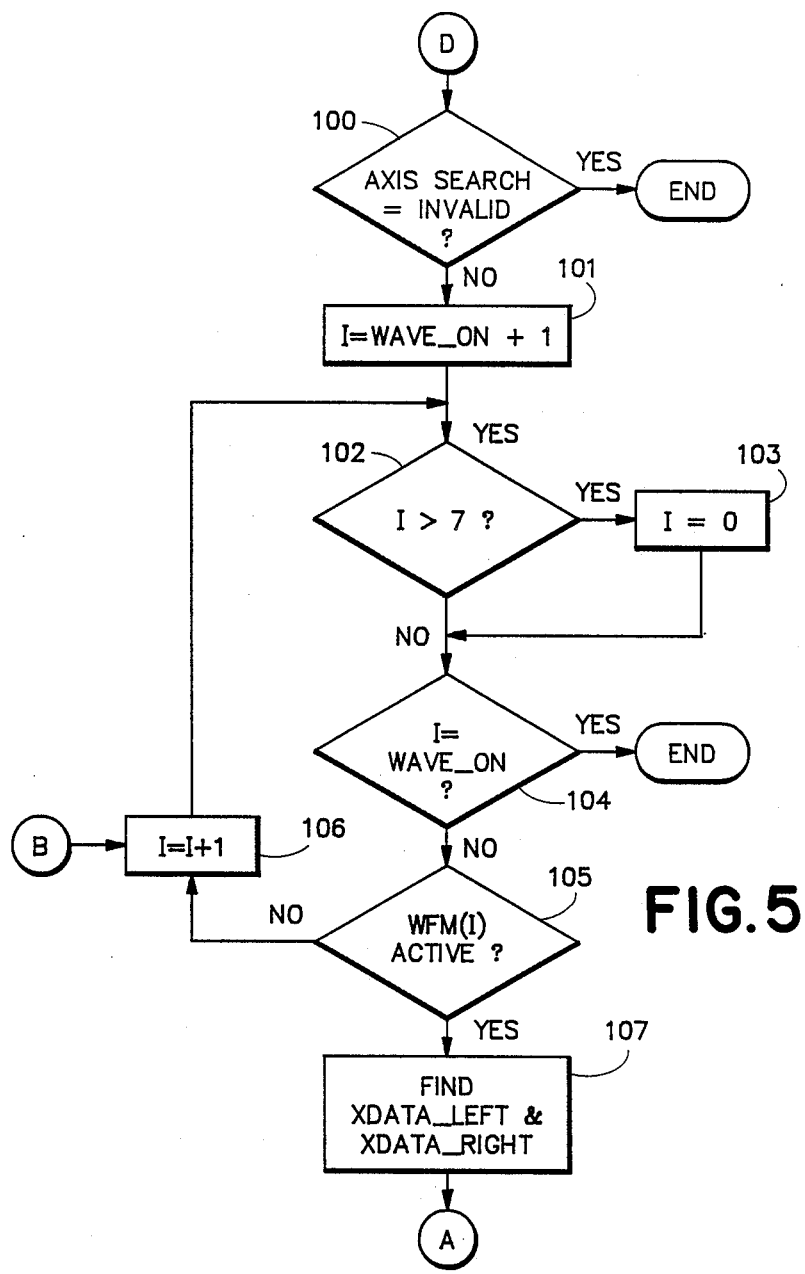
FIG. 5 shows a flow chart which replaces the flow chart of FIG. 3B in an alternative embodiment of the invention.

In an alternative embodiment of the invention, the flow chart portion shown in FIG. 5 replaces that shown in FIG. 3B.

Referring to block 100 of FIG. 5, which block is similar to block 68 of FIG. 3B, if the axis search flag is not invalid, then in block 101 an integer I is set equal to wave__on +1 wherein wave__on is the number of the last selected waveform. If I is greater than 7 (block 102), then I is set to 0 (block 103); if I is not greater than 0 (block 102), or after I is set to 0 (block 103), the microcomputer checks to see if I is equal to wave__on (block 104). If I is not equal to wave__on, the microcomputer checks to see if waveform I is active (block 105). If waveform I is active, then starting in block 110 (similar to block 76 of FIG. 3B) the microcomputer checks to see if waveform I passes through the touchzone touched by the operator, and if so, causes waveform I to be selected. If waveform I is not active (block 105) or if waveform I is active but was determined not to have passed through the touchzone, then (block 106) the value of I is incremented and program flow returns to block 102. The program runs until an active waveform is found within the touchzone or until, in block 104, I is equal to wave__on. Since wave__on is the number of the currently selected waveform, the routine ends in block 104 with waveform wave__on still selected if no waveform passes through the touch zone. Since in FIG. 5 the search for an active waveform begins with waveform wave__on+1, rather than with waveform 0 (as shown in FIG. 3B), then each time the operator touches a touchzone through which more than one waveform passes, a different waveform will be selected.

Thus a microcomputer-based digital oscilloscope has been described which permits an operator to indicate to the oscilloscope selection of a particular one of a set of displayed waveforms by touching any part of the waveform's image on the screen. This method of waveform selection is fast, intuitive and less prone to error than waveform selection systems of the prior art utilizing pushbuttons or menus for waveform selection. The microcomputer within the oscilloscope determines the touch zone touched by the operator's finger on the screen in response to input from a touchscreen mechanism and determines from data utilized to control the display of each waveform whether any portion of any displayed waveform passes through the touch zone touched by the operator. If a portion of a particular waveform passes through the touch zone, the microcomputer reconfigures the oscilloscope to subsequently carry out such operations as may be relevant to an operator-selected waveform with that particular waveform as the operator-selected waveform.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

APPENDIX I

Software Listing
Re U.S. Patent Application
WAVEFORM SELECTION BY TOUCH
James L. Tallman and Terry G. Sherbeck
Copyright © 1986 Tektronix, Inc.

```
wave__touch:    Procedure (xtouch,ytouch) byte public;
  declare (xtouch,ytouch) byte;
  declare data__ptr pointer;
  declare k integer;
  declare wave__data based data__ptr (1) integer;
  declare(i,j,wave__on,xdata__left,xdata__right,axis__search)
  word;
  declare (ydata__upper,ydata__lower) integer;
  axis__search=INVALID;
  If(ytouch> =4 and ytouch< =20) then do;
    axis__search=0;
    ydata__upper=sal((int(ytouch)−4)*30−256+29,7);
    ydata__lower=sal((int(ytouch)−4)*30−256,7);
  end;
  wave__on=INVALID;
  if (axis__search<>INVALID) then do;
    do i=0 TO 7;
      if (wfm__rec(i) inuse=ACTIVE and wfm__rec(i)
      axis=axis__search)
      then do;
        xdata__left=wfm__rec(i) length*(xtouch−1)/10;
        xdata__right=wfm__rec(i) length*xtouch/10;
        data__prt=wfm__rec(i) data__ptr;
        if (xdata__left<xdata__right) then
        do j=xdata__left to xdata__right−1;
          if ((wave__data(j)> =ydata__lower and
              wave__data(j)< =ydata upper) or
              (wave__data(j)<ydata lower and
              wave__data(j+1)>ydata__lower) or
              (wave__data(j)>ydata__upper and
              wave__data(j+1)<ydata__upper))
              then wave__on=i;
        end;
      end;
    end;
    if (wave__on<>INVALID) then call
    select__wfm(wave__on);
  end;
end wave__touch;
```

We claim:

1. For an oscilloscope capable of simultaneously displaying a plurality of waveforms on a screen, each waveform formed by pixels on said screen, said oscilloscope being further capable of performing at least one operation with respect to a selected one of the displayed waveforms, a method for selecting said one waveform comprising the steps of:

storing in memory means waveform data indicating a position on said screen of each pixel forming each of said plurality of waveforms;

determining when an object is proximate said screen;

determining a particular area of said screen nearest said object from among a plurality of screen areas;

reading said waveform data stored in said memory means;

determining from the waveform data read positions on said screen of pixels forming said waveforms;

determining from said waveform data stored in said memory means whether any one waveform of said plurality of waveforms passes through said particular area of said screen nearest to said object by comparing determined positions on said screen of pixels forming said any one waveform to positions on said screen included in said particular area; and selecting said any one waveform passing through said particular area of said screen nearest said object.

2. The method according to claim 1 wherein the step of determining from said waveform data stored in said memory means whether any one waveform of said plurality of waveforms passes through said particular area of said screen nearest to said object comprises the substep of determining from said waveform data whether any pixel of any of said plurality of waveforms is positioned within said particular area of said screen.

3. For an oscilloscope capable of simultaneously displaying a plurality of waveforms on a screen, each waveform comprising a separate line of pixels, a vertical position of each pixel on said screen being determined according to a magnitude of corresponding waveform data stored in memory means, said oscilloscope being further capable of performing at least one operation with respect to a selected one of the displayed waveforms, a method for selecting said one waveform comprising the steps of:

determining when an object is proximate said screen;

determining a particular area of said screen nearest said object from among a plurality of screen areas;

determining from said waveform data stored in said memory means whether any one waveform of said plurality of waveforms passes through said particular area of said screen nearest to said object; and selecting said any one waveform passing through said particular area of said screen nearest said object, wherein the step of determining from said waveform data stored in said memory means whether any one waveform of said plurality of waveforms passes through said particular area of said screen nearest to said object comprises the substeps of:

determining from said waveform data whether any pixel of any of said plurality of waveforms is positioned within said particular area of said screen, and determining from said waveform data corresponding to each pixel whether any two horizontally consecutive pixels of a line of pixels comprising any one of said plurality of waveforms are vertically and horizontally positioned on said screen such that one of said two pixels is above said particular area of said screen while the other of said two pixels is below said particular area of said screen.

4. For an oscilloscope capable of simultaneously displaying a plurality of waveforms on a screen and capable of performing at least one operation with respect to a selected one of the displayed waveforms, a method for selecting a waveform, the method comprising the steps of:

determining when an object is proximate to said screen;

determining a particular area of said screen nearest said object from among a plurality of separate screen areas;

determining which of said waveforms was last selected;

selecting another of said waveforms other than the last selected waveform when said particular area of said screen contains a portion of said another waveform; and selecting said last selected waveform when said particular area of said screen does not contain a portion of any other of said waveforms.

5. For an oscilloscope capable of simultaneously displaying a plurality of waveforms of a screen in accordance with stored data produced by digitizing input signals and capable of performing at least one operation with respect to a selected one of the displayed waveforms, an apparatus for selecting said one waveform comprising:

memory means for storing waveform data indicating a position on said screen of each pixel forming each of said plurality of waveforms;

means providing signals indicating when an object is proximate said screen and indicating a particular area of said screen nearest said object with respect to a plurality of separate screen areas; and means responsive to said signals for reading said waveform data stored in said memory means, for determining from the waveform data read positions on said screen of individual pixels forming said waveforms, for determining whether any one waveform of said plurality of waveforms passes through said particular area of said screen nearest to said object by comparing determined positions on said screen of individual pixels to positions on said screen included in said particular area, and for selecting said one waveform when said stored data indicates that said particular area of said screen contains any portion of said one waveform.

6. For an oscilloscope capable of simultaneously displaying a plurality of waveforms on a screen in accordance with stored waveform data and capable of performing at least one operation with respect to a selected one of the displayed waveforms, an apparatus for selecting said one waveform comprising:

memory means for storing waveform data indicating a position on said screen of each pixel forming each of said plurality of waveforms;

first means for directing a plurality of light beams across and proximate said screen, for determining whether each beam strikes an object proximate the screen, and for producing signals indicating which of said plurality of light beams strike an object proximate said screen; and second means for determining from said signals a particular area of said screen nearest said object from among a plurality of separate screen areas, for determining from said waveform data whether any portion of said one waveform is contained in said particular area by determining from the waveform data stored in said memory means positions on said screen of individual pixels forming said waveforms and by comparing determined positions of said individual pixels to positions included in said particular area, and for selecting said one waveform when said particular area of said screen contains any portion of said one waveform.

7. The apparatus of claim 6 wherein said first means comprises:

means for directing a first group of said plurality of light beams across and proximate to said screen, said first group of light beams being parallel to one another;

means for directing a second group of said light beams across and proximate to said screen, said second group of light beams being parallel to one another and perpendicular to each of said first group of light beams such that said first and second groups of light beams form a rectangular grid of light beams; and means corresponding to said each of said light beams for producing a signal of state indicating whether the corresponding light beam strikes said object.

8. For an oscilloscope capable of simultaneously displaying a plurality of waveforms on a screen, each waveform comprising a separate line of pixels, the vertical position of each pixel on said screen being determined according to the magnitude of corresponding waveform data stored in memory means, said oscilloscope being further capable of performing at least one operation with respect to a selected one of the displayed waveforms, an apparatus for selecting said one waveform comprising:

memory means for storing waveform data indicating a position on said screen of each pixel forming each of said plurality of waveforms;

first means for generating position data indicating when an object is proximate to said screen and indicating a particular area of said screen nearest to said object from among a plurality of separate screen areas; and second means for determining from said position data and from said waveform data stored in said memory means whether any one waveform of said plurality of waveforms passes through said particular area of said screen nearest to said object by determining from the waveform data positions on said screen of individual pixels forming said waveforms and comparing determined positions of said individual pixels to positions included in said particular area.

* * * * *